United States Patent [19]

Grove

[11] 4,004,262

[45] Jan. 18, 1977

[54] ELECTROMAGNET FOR PROVIDING BALANCED FRICTION FACE PRESSURES ON AN ARMATURE IN A VEHICLE ELECTRIC BRAKE SYSTEM

[76] Inventor: Leroy K. Grove, 512 S. Merrifield Ave., Mishawaka, Ind. 46544

[22] Filed: Mar. 11, 1975

[21] Appl. No.: 557,251

[52] U.S. Cl. .............................. 335/281; 188/138; 335/286

[51] Int. Cl.² ..................... H01F 7/08; F16D 65/34

[58] Field of Search .......... 335/299, 287, 286, 272, 335/269, 281; 310/77; 188/138

[56] References Cited

UNITED STATES PATENTS

| | | | |
|---|---|---|---|
| 3,476,223 | 11/1969 | Hubbard | 335/299 |
| 3,760,909 | 9/1973 | Grove | 310/77 |

*Primary Examiner*—Harold Broome
*Attorney, Agent, or Firm*—Marmaduke A. Hobbs

[57] ABSTRACT

An electromagnet for use in electric brakes and similar type clutches which will apply balanced friction face pressure against a rotating armature face despite the additional, externally imposed, pressures which are directed to its leading edge by tipping moments existing at its point of restraint. The electromagnet departs from conventional design in that a non-magnetic wear or friction face replaces a sufficient area of the outer magnetic pole face on the leading edge of the electromagnet to insure that the externally imposed forces on the leading edge of the electromagnet are balanced by the magnetic linkage forces existing in the rest of the electromagnet faces. Balanced friction face pressure greatly increases the performance and useful life of an electromagnet and the electric brake or clutch system which it actuates.

15 Claims, 5 Drawing Figures

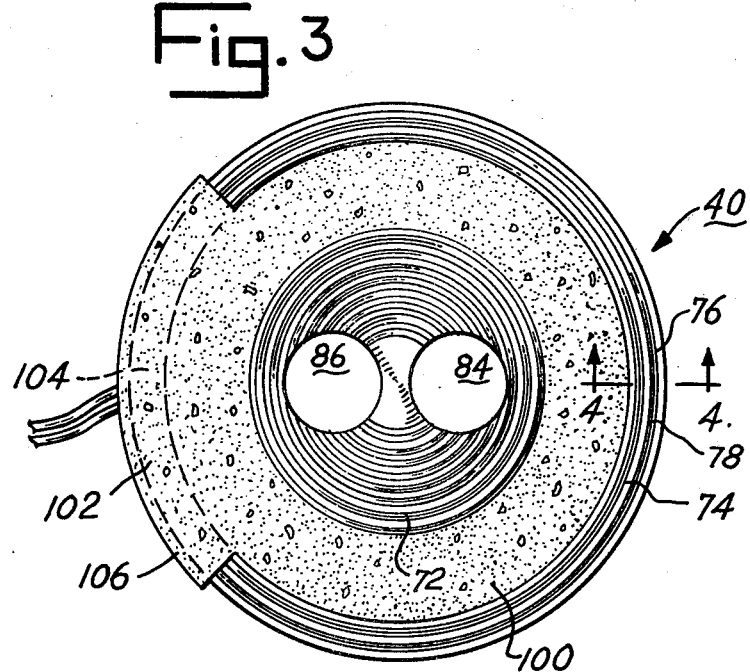
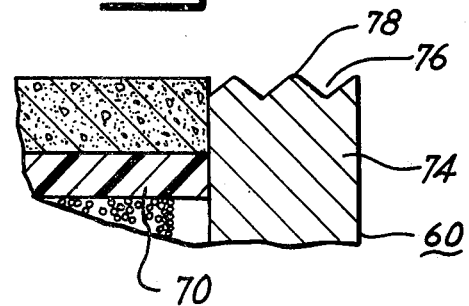
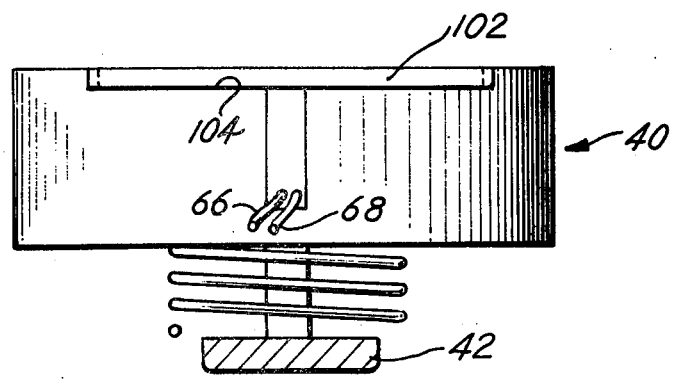

ELECTROMAGNET FOR PROVIDING BALANCED FRICTION FACE PRESSURES ON AN ARMATURE IN A VEHICLE ELECTRIC BRAKE SYSTEM

The present invention primarily involves a system for electrically actuating brakes and clutches, and the function and construction of an electromagnet for use in such a system. Such a system can be used in power transmission clutches and brakes, in vehicular electric brakes, or in any application where the magnetic attraction of an electromagnet to an armature is employed as the linkage force for a direct frictional drive or braking function.

This invention primarily concerns an electromagnet of a fundamentally different construction whereby the magnetic linkage force field is compensatingly shifted to counterbalance environmentally imposed pressures on the leading edge of its friction face. While in no way limiting this invention to a single application, the objects, features and advantages of this invention will become apparent as it is shown how this invention relates to a system of electrically actuated vehicular brakes and specifically to the construction of an electromagnet for use in such a system.

In a conventional, hydraulically actuated brake, a pair of brake shoes are pivotally secured to a stationary brake back-up plate and are moved into contact with a brake drum by the actuation of a piston in a hydraulic brake cylinder responsive to fluid pressure applied to the brake cylinder. In an electrically actuated system, the brake shoes are moved by means responsive to an electrical current, such a system being exemplified by the patent to William F. Penrose, U.S. Pat. No. 2,273,065. In these electrically operative systems, a lever arm is pivotally secured to the brake back-up plate such that rotation of the lever arm causes movement of the brake shoes into contact with the brake drum. At the end of the lever arm is secured an electromagnet which is usually maintained in sliding contact with an armature plate which is secured to and moves with the brake drum. In a one piece cast iron drum and hub assembly, the face of the drum may serve as the armature plate. When the electromagnet is energized, it is magnetically attracted to the rotating armature plate, and, due to the friction between these two metal parts so attracted, a force is imposed on the electromagnet tending to move it in the direction of movement of the armature. This force is in turn transmitted by the lever arm to actuate the brake shoes into braking engagement with a brake drum.

In the present state of the art, brake electromagnets are generally attached to the brake shoe actuating arm as described in U.S. Pat. Nos. 2,273,065, 3,244,259, and 3,757,264. As set forth in U.S. Pat. No. 2,273,065 and specifically reconfirmed in U.S. Pat. Nos. 3,244,259 and 3,757,264, it is desirable to mount the electromagnet non-rigidly on the lever arm from within the central portion of the electromagnet and at a plane closely adjacent that of the rubbing contact between armature and electromagnet in order to reduce the moments tending to overturn the electromagnet. This relationship helps to prevent the establishment of unequal pressures on the face of the electromagnet, and hence helps to minimize the production of localized high temperature and high pressure areas. It is also desirable to mount the electromagnet so that it has limited freedom of axial and universal pivotal movement with respect to the lever arm. If the armature in rotating tends to oscillate slightly in the axial direction due to end play, or to wobble or otherwise run out of true, the electromagnet can move in accommodation therewith, thereby tending to maintain the desired flat rubbing contact relationship between the electromagnet and armature faces. The moments tending to tip or overturn the electromagnet produce unequal pressures on the friction face of the electromagnet, and the resulting high pressure and high temperature areas of the friction face are extremely detrimental to the braking performance and useful life of the electromagnet.

In operation, the electromagnet, when energized, forceably attaches itself to the rotating armature and is literally yanked in the direction of the rotating armature until restrained by the brake actuating arm. The drum armature continues to rotate and generates extreme surface friction and heat at the face of the electromagnet. The tilting moments created at the point of restraint of the electromagnet by the actuating arm impose an increased contact pressure on the leading edge of the electromagnet, i.e., the edge meeting the oncoming armature face, and a corresponding reduction of pressure on the trailing edge. This of course increases the friction and wear on the leading edge of the electromagnet. As the leading edge wears down, it forms a new tapered friction face plane from the leading edge to the point of actuating arm restraint, and in a relatively short time the trailing half of the electromagnet is not in contact with the armature. Hence, the braking effectiveness of the electromagnet is continuously reduced until complete failure occurs.

While much worthwhile effort has been expended to reduce or minimize the magnitude of these tipping moments, as illustrated in the above listed patents, the present state of the art recognizes that it is impractical, if not impossible, to eliminate them entirely. Accepting the presence of these tipping moments and the added pressures they cause to be imposed on the leading edge of the electromagnet, it is the principal object of this invention to provide an electromagnet which will maintain a balanced, equally distributed, full flat faced, frictional pressure against the rotating armature of the electric brake.

In the commonly used, flat faced, central core type, direct current electromagnet, the central core is of one polarity and the outer skirt or wall is of the opposite polarity. A non-magnetic frictional surface or washer disposed between the two poles completes the frontal face of the electromagnet to form a planar friction face. With the exception of a relatively small lead wire slot, the outer skirt or wall of the conventional electromagnet is designed to be more or less radially symmetrical about the central core to produce a balanced or equally distributed linkage force or attraction to a flat armature face. However, as explained before, when the electromagnet is harnessed to produce work in actuating an electric brake, tipping moments at the point of restraint direct additional pressures to the leading edge of the electromagnet face, and the conventionally designed electromagnet can no longer apply a balanced or equally distributed face pressure against the armature.

The objects of this invention are accomplished by providing an electromagnet which is designed for a single purpose: namely, to actuate efficiently an electric brake in the existing environmental conditions. Unlike conventional electromagnets, it accepts and even utilizes the externally imposed forces on its leading edge to maintain a balanced, equally distributed, full, flat faced, frictional pressure against the rotating armature of the brake.

This electromagnet departs from conventional design in that its magnetic linkage force field has been shifted aft or away from the electromagnet leading edge to magnetically balance the environmentally imposed forces on its leading edge. This is achieved by utilizing a non-magnetic, high reluctance, wear or friction face at the leading edge of the electromagnet. The area of this non-magetic wear or friction face can be controlled to "blank out" or remove magnetic linkage force from a sufficient area of the leading edge of the electromagnet to provide that the externally imposed forces on the leading edge of the electromagnet are exactly balanced by the magnetic linkage forces existing in the rest of the electromagnet face. Thus, by custom tailoring of the magnetic linkage force field of the electromagnet face, an efficient electromagnet which will maintain a balanced, full, flat faced frictional pressure on the armature, is provided for an electric brake system. This accomplishes the principal objective of this invention.

In one inexpensive, practical embodiment of this invention, a conventional brake electromagnet can be modified to incorporate the features of this invention. This is accomplished by accommodatingly lowering the magnetic outer pole face skirt or wall on the leading edge of the electromagnet to serve as a support for an extension of the conventionally used non-magnetic inner friction face of the electromagnet radially outward to or even beyond the leading edge of the magnet body. The area and thickness of the non-magnetic friction material covering the leading edge of the outer magnetic pole face or wall is sized to insure that magnetic linkage forces existing in the rest of the electromagnet face balance external forces directed to the electromagnet face leading edge by tipping moments.

Achieving the principal object of this invention — providing an electromagnet which will maintain a balanced, equally distributed, full flat faced, frictional pressure against the rotating armature of the brake — simultaneously accomplishes many other objectives. Thus this unique electromagnet will achieve the following: (a) uniformly even wear over the entire face of the electromagnet which insures a useful life many times longer than its conventional counterpart; (b) consistent, predictable, braking performance over the entire life of the electromagnet because the full flat faced frictional contact is maintained for the entire life of the electromagnet; (c) efficient full power output to permit use of a smaller, less expensive electromagnet; (d) a longer effective life of the armature face because the leading edge of the electromagnet does not gouge and score the armature face; (e) quiet operation without the shrill squeal which often occurs in electric brakes because of the high frequency vibrations developed at the metal leading edge of the conventional electromagnet as it tends to tip into the oncoming armature face; (f) even distribution of frictional heat over the entire face of the electromagnet; no localized overheating; (g) the elimination of the smearing of molten metal from the leading edge across the face of the magnet as in contemporary electromagnets (in this invention the leading edge is not overheated, and is not even metal); and (h) maximum utilization of the performance benefits obtainable by incorporating alternate lands and recesses in the magnetic pole faces as taught in my U.S. Pat. No. 3,760,909.

When the metal magnetic poles are used as the principal frictional contact surface, the flat even wear characteristics of this new and novel electromagnet preserve the uniform land-recess pole face configuration for the life of the electromagnet. In the prior electromagnets the lands wear away most rapidly where they are most needed, on the leading edge.

The balanced face pressure characteristics of this unique electromagnet can be combined with the land and recess pole face configuration disclosed in my U.S. Pat. No. 3,760,909 to produce a new, practical, and inexpensive embodiment of the electromagnet disclosed and claimed in my U.S. Pat. No. 3,668,445, issued June 6, 1972. In this new embodiment the magnetic poles of the electromagnet provide the magnetic linkage force to attract the electromagnet to the armature, while the rapid wear characteristics of relatively narrow lands assures that the more wear resistant, brake lining type, non-magnetic friction face will provide the principal or only frictional contact between the electromagnet and the rotating armature face. The advantages of this type of electromagnet for use in electric brakes are described in my U.S. Pat. No. 3,668,445.

The objects and advantages of the present invention will become more apparent from the following description and accompanying drawings, wherein:

FIG. 3 is an enlarged plan view of the electromagnet shown in FIGS. 1 and 2;

Figure 1:
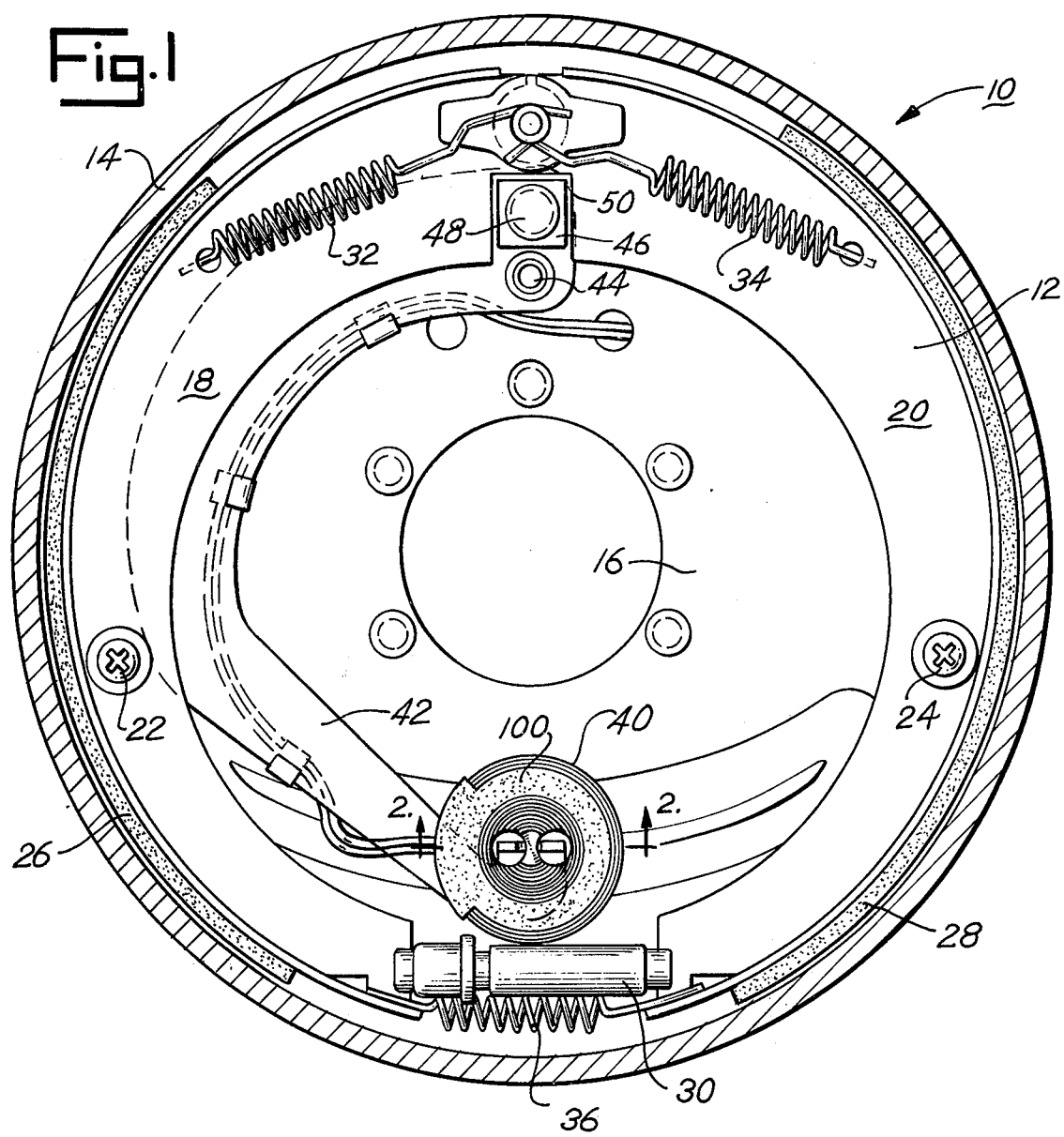
FIG. 1 is an elevational view of a (left wheel) backing plate, brake shoes and operating mechanism of the type which may be used in combination with my new electromagnet and with a drum shown in transverse cross section.
Figure 2:
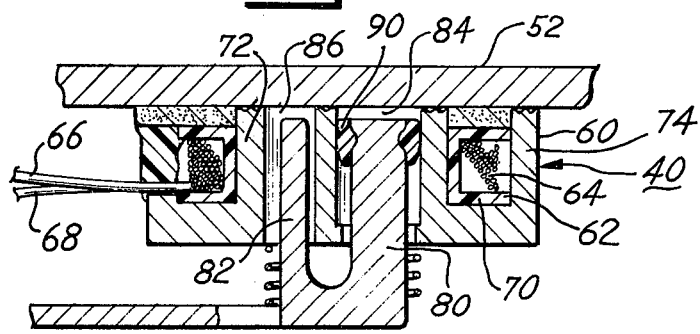
FIG. 2 is an enlarged, cross-sectional view of the electromagnet and a portion of the brake armature shown in FIG. 1, the section being taken on line 2—2 of the latter figure.

FIG. 4 is an enlarged fragmentary cross-sectional view of the electromagnet shown in the preceding figures, the section being taken on line 4—4 of FIG. 3; and FIG. 5 is an enlarged side elevational view of the brake electromagnet, showing the leading edge thereof. Referring more specifically to the drawings and FIG. 1 in particular, numeral 10 indicates generally the brake assembly, including a brake operating mechanism 12 and a brake drum 14 which is attached to and normally forms a part of the wheel structure of the vehicle in which the brake is used. The brake assembly includes a backing plate 16 on which brake shoes 18 and 20 pivotally mounted and movably secured thereto or restrained by spring-loaded retaining pin assemblies 22 and 24, respectively. The brake shoes contain friction material 26 and 28 bonded to the external surface of the brake shoes, and engage the internal surface of drum 14 when the brake is applied. An adjustment screw 30 interconnects the brake shoes which are yieldably retained in their retracted position from the brake drum by springs 32, 34 and 36.

The brake actuating mechanism for applying brake shoes 18 and 20 into braking engagement with the drum consists of an electromagnet 40, embodying the present invention, mounted on a lever 42 which in turn is pivotally connected to a pin 44 secured to backing plate 16. Lever 42 swings on pin 44 and is curved in an off-set manner to pass around the drum axis and to position the electromagnet at a point 180° from pin 44.

Arm 42 includes an extension or short arm 46 carrying a pin 48 on which is mounted a swivel block 50, which bears against the adjacent ends of the brake shoes. The magnet is operated in conjunction with an armature 52 formed integrally with and/or connected directly to brake drum 14 on a plane parallel with backing plate 16. The magnet 40 faces the armature and is adapted to frictionally engage the face thereof when energized.

With the armature and the brake drum 14 rotating in a counterclockwise direction (forward motion for the left wheel brake assembly depicted), electromagnet 40, when energized, will be moved to the right, as viewed in FIG. 1, thereby moving swivel block 50 to the left so that it pushes against the end of brake shoe 18 to move the shoe outwardly into braking engagement with the internal surface of drum 14. The engagement of the brake shoe 18 with the drum in turn develops a self-energizing force on shoe 18, which is transmitted through screw 30 to brake shoe 20 to cause the latter shoe to move into braking engagement with the internal surface of drum 14. With the rotation of the armature plate 52 and brake drum in the clockwise direction, the action just described is performed in reverse with the electromagnet moving to the left to cause swivel block 50 to engage the adjacent end of the brake shoe 20 which in turn, through screw 30, actuates brake shoe 18. When the electromagnet is released or de-energized, the two springs 32 and 34 disengage the brake shoes from the drum, returning them and the electromagnet to the position illustrated in FIG. 1.

The electromagnet 40 which embodies my invention consists of a ferrous metal housing 60 carrying the magnetic flux and a coil assembly 62 for producing the magnetic field. The metal housing may be constructed of powdered iron formed and compressed to high density in its finished size and shape and sintered at high temperatures to impart its structural strength, and is produced on automated machinery, ready for assembly without further machining. The coil assembly consists of the magnet wire 64 and lead wires 66 and 68 assembled on an electrically insulating bobbin 70 and is disposed in an annular recess between center pole 72 and outer annular pole 74, the two poles preferably containing recesses and lands 76 and 78. The advantages of the alternate lands and recesses on the pole faces are disclosed and claimed in my U.S. Pat. No. 3,760,909 issued on Sept. 25, 1973. The lands may be narrow as shown and wear rapidly to permit a more wear resistant, non-magnetic, brake lining type friction material to serve as the principal friction face of the electromagnet. Alternatively the lands may be wide enough to serve as the principal wear and friction face when used with a less wear resistant non-magnetic frictional material.

The magnet 40 may be secured to the arm by any suitable attachment means, the means shown in the drawings consisting of fingers 80 and 82 joined integrally at a right angle to lever 42 and extending into holes 84 and 86, respectively, in the center pole of magnet 40. A force transmitting bushing 90, which is secured to the end of finger 80 and retains the magnet on the fingers fits freely in the larger diameter of hole 84 with only the spherical diameter of the bushing contacting the cylindrical wall of the hole as near as practical to the frictional face of the magnet. This design helps minimize tilting moments while permitting smooth, friction free, limited universal movement of the magnet. Round restraining hole 84 is located off center toward the trailing edge of the magnet, thus permitting the anti-rotational hole 86 to be in the center core rather than on the outer periphery of the magnet. This type of attachment means is disclosed and claimed in my U.S. Pat. No. 3,757,264 issued on Sept. 4, 1973.

A non-magnetic (i.e., high reluctance) friction member 100 contacts the surface of the armature and is shown constructed of a high coefficient of friction brake lining type of wear and friction material which provides an effective friction between the magnet and the armature. Member 100 is shown formed as a separate piece and seated in the recess between the center and outer poles and extending over the outer pole on the leading edge. The friction member is held in place by epoxy or other suitable means and the wear or friction face of the member is essentially on a plane with the peaks of lands 78. While it is not intended to limit the scope of this invention to any particular material, another example of a suitable material for the friction member is a glass filled polycarbonate plastic such as General Electric Company's Lenxan. Other suitable materials are epoxy, polyurethane and a natural or synthetic rubber base friction material. These materials all fill the requirements and can be molded for the most economical high production. These materials will also lend themselves to an integrated friction member and bobbin of the coil so that the two parts can be manufactured as a single unit if desired.

The principal feature of the invention in this embodiment, involves the extension of member 100 on the leading edge, forming a lip 102 which extends over the edge of the outer pole and seats in a peripheral recess in the outer pole shown in broken lines and indicated generally by numeral 104. The lip 102 preferably projects beyond the external periphery of the outer pole as indicated by numeral 106. This extension or lip 102 of friction member 100 over the leading edge of the outer pole, provides an electromagnet for the brake in which the electromagnet linkage force field is shifted away from the leading edge of the electromagnet to balance magnetically the tilting force externally imposed on the electromagnet leading edge. The remaining uncovered part of the outer pole provides a magnetic face for transmitting the lines of force in the magnetic field through the electromagnet and armature.

In the operation of the conventional brake electromagnet, the electromagnet tends to tip toward the leading edge where the greatest wear in the friction face occurs and the wear tends to decrease progressively toward the trailing end. This greatly reduces the surface area capable of contacting the armature and hence reduces the effectiveness of the electromagnet. In the operation of the present electromagnet, lip 102 and the interruption of the outer pole by recess 104 on the leading edge, eliminate or minimize the magnetic force at the leading edge, thereby permitting the combination of magnetic forces and physical forces from the rotation of the armature against the electromagnet to balance the pressure over the entire face of the electromagnet, thereby providing an effective uniform frictional contact and wear over the entire face, rather than concentrating the forces at the forward edge. Balancing of the magnetic and physical forces to any particular application is achieved by varying the length in the peripheral dimension of the lip. The magnitude of the externally imposed forces directed to the leading edge of the electromagnet face by tipping moments at the point of restraint becomes apparent when it is noted that this particular embodiment requires lip 102 to cancel the magnetic force field of one fourth of the outer pole face. Thus by designing the electromagnet for a particular brake application, the magnetic linkage force field of the electromagnet face can be controlled to eliminate the detrimental tipping effects occurring in a conventional electromagnet.

While only one embodiment of the present brake magnet has been shown and described in detail herein, various changes and modifications may be made without departing from the scope of the invention.

I claim:

1. An electromagnet for use in electric brakes, clutches and the like having an armature rotating relative to said electromagnet and an actuating arm attached to and restraining said electromagnet, comprising a body of low reluctance magnetic material having an inner pole and an outer pole defining a cavity and having leading and trailing edges relative to the normal forward rotation of the armature, an electric coil disposed in said cavity, said poles having planar faces for engaging the armature, with the leading edge of said outer pole which first engages the oncoming armature face having a recess therein forming a non-magnetic sector, and a nonmagnetic wear member in said cavity and recess for engaging the armature, said non-magnetic sector on the leading edge of said outer pole being of a size of at least 45° taken from a point on the center line spaced from the leading edge equal in distance to the distance from the center line to the lateral side edges at right angles to said center line.

2. An electromagnet for brakes and clutches as defined in claim 1 in which said non-magnetic wear member projects beyond the leading edge of said outer pole and is seated in a recess in said leading edge.

3. An electromagnet for brakes and clutches as defined in claim 1 in which said outer pole is cylindrical in shape and said wear member projects beyond the periphery thereof.

4. An electromagnet for brakes and clutches as defined in claim 3 in which the armature contact face of the poles is provided with alternate lands and recesses.

5. An electromagnet for brakes and clutches having an armature, comprising a cylindrical center pole and an annular outer pole spaced from said center pole and forming a recess therebetween, leading and trailing edges on said outer pole relative to the normal forward rotation of said armature with the leading edge of said outer pole first engaging the oncoming armature face, and electric coil in said recess, a flat friction member disposed in said recess and having its outer surface on substantially the same plane as the armature contact surfaces of said poles, a recess in the face of the leading edge of the outer pole of a depth approximately the same as the thickness of said friction member and extending throughout at least 45° of said annular outer pole, and an extension on said friction member disposed in said recess in the face of said outer pole and forming a substantially nonmagnetic sector in said leading edge.

6. An electromagnet for brakes and clutches as defined in claim 5 in which lands and recesses are provided in the armature contact surface in one of said poles.

7. An electromagnet for brakes and clutches as defined in claim 5 in which lands and recesses are provided in the armature contact surfaces of both of said poles.

8. An electromagnet for brakes and clutches as defined in claim 5 in which said coil is on a bobbin and said friction member is formed integrally with said bobbin.

9. An electromagnet for brakes and clutches as defined in claim 5 in which said extension on said friction member projects beyond the periphery of the outer pole.

10. An electromagnet for brakes and clutches as defined in claim 7 in which said lands and recesses in said poles are curved and are concentric with the center of the magnet.

11. An electromagnet for brakes and clutches as defined in claim 5 in which the recess in the contact face of the outer pole and the thickness of the friction member in said recess are sufficient to reduce the magnetic forces at the forward edge of the magnet to a point substantially less than the magnetic forces throughout the remainder of the magnet.

12. An electromagnet for brakes and clutches as defined in claim 7 in which the friction material consists of polycarbonate plastic material impregnated with an abrasive material.

13. An electromagnet for use in electric brakes, clutches and the like having an armature rotating relative to said electromagnet and an actuating arm attached to and restraining said electromagnet, comprising a ferrous body having a cavity defines by an inner pole and an outer pole and having leading and trailing edges relative to the normal forward rotation of the armature, said poles having planar faces for engaging the armature with the leading edge section, the leading edge of said outer pole first engaging the oncoming armature face having a recess forming a non-magnetic sector, an electric coil assembly disposed in said cavity in said body, and a non-magnetic friction member disposed in said cavity and recess for engaging the armature, said non-magnetic sector on the leading edge of said outer pole being of a size of at least 45° taken from a point on the center line spaced from the leading edge equal in distance to the distance from the center line to the lateral side edges at right angles to said center line.

14. The electromagnet as set forth in claim 13 wherein the armature contact face of the poles is provided with alternate lands and recesses.

15. The electromagnet as set forth in claim 13 wherein said non-magnetic friction material disposed in the annular cavity extends outward toward the leading edge of the electromagnet to serve as the non-magnetic friction material, said non-magnetic friction material being seated on said outer pole in said recess, and said non-magnetic friction material consists of a slow wearing, high coefficient of friction, brake lining type of material and the lands in the armature contact faces of the poles are relatively narrow to provide that the faces of the poles are wearable on contact with said armature at a rate greater than said friction material for maintaining said friction material as the primary contact of the electromagnet with the armature.

* * * * *